Patented Sept. 10, 1929.

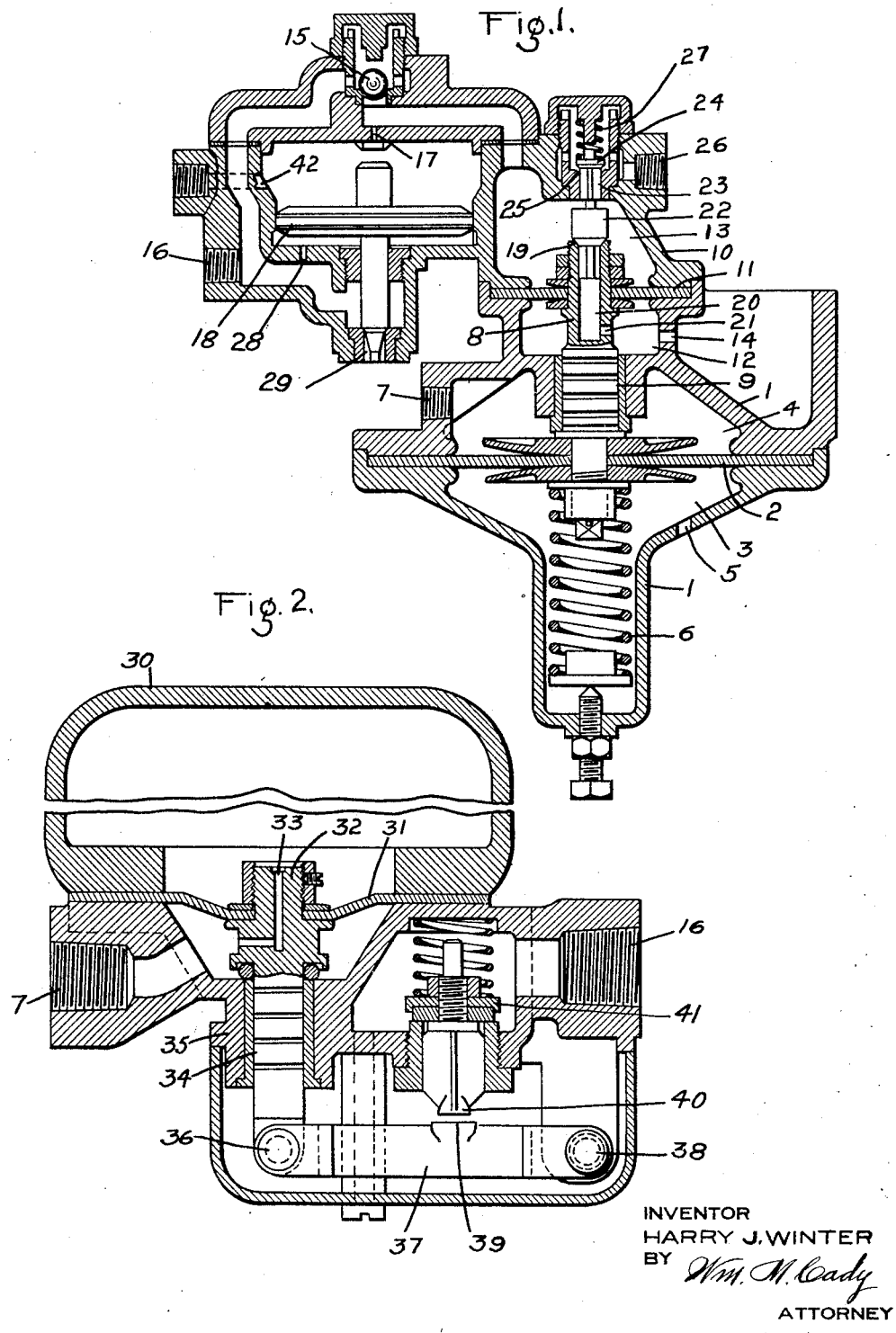

1,727,385

UNITED STATES PATENT OFFICE.

HARRY J. WINTER, OF LONDON, ENGLAND, ASSIGNOR TO WESTINGHOUSE AIR BRAKE COMPANY, OF WILMERDING, PENNSYLVANIA, A CORPORATION OF PENNSYLVANIA.

FLUID-PRESSURE BRAKE.

Application filed March 19, 1928, Serial No. 262,758, and in Great Britain May 21, 1927.

This invention relates to fluid pressure braking apparatus of the kind in which braking equipments of two different types are provided on all or certain vehicles of a train, the locomotive brakes for instance being of the vacuum type while the train brakes are of the automatic compressed air type.

The invention has for its object to provide improved arrangements whereby the operation of the two braking equipments may be rendered dependent upon one another so that for instance, the application of the locomotive vacuum brakes may automatically cause an application of the brakes throughout the train by the release of fluid under pressure from the automatic train pipe, the degree of application of the brakes in the case of the two equipments, being proportional to one another.

According to the principal feature of the invention the improved apparatus comprises a valve for controlling the release of fluid under pressure from the automatic brake pipe preferably through an equalizing discharge valve mechanism of the well known type, this valve being automatically controlled by the combined action of the automatic brake pipe pressure, the pressure obtaining in the vacuum brake pipe and a suitable constant pressure in such a manner that an application of the vacuum brake causes a corresponding reduction of the pressure in the automatic brake pipe down to a predetermined minimum limit dependent upon the adjustment of the constant pressure above referred to.

A further feature of the invention consists in the provision of an additional valve mechanism for releasing fluid under pressure from the automatic brake pipe in the case of an emergency application of the brakes, this valve being operated only when the vacuum brake pipe pressure is raised to an extent corresponding to an emergency application of the brakes.

The invention will now be described, by way of example, with reference to the accompanying drawings, in which, Figure 1 is a sectional view of a control valve device embodying the invention, Figure 2 being a sectional view of a preferred form of emergency valve.

Referring first to Figure 1 the control valve comprises a suitable casing 1 within which is contained a flexible diaphragm 2, in a horizontal plane, separating the casing 1 into two compartments or chambers 3, 4. The compartment 3 is open to the atmosphere through an aperture 5 in the casing wall and contains a spring 6 adapted to exert an upward pressure on the diaphragm 2.

The upper compartment 4 is connected to the vacuum brake pipe at 7 and the diaphragm 2 is provided with a vertical stem 8 extending through a fluid tight packing 9 into an upper extension 10 of the casing 1, the upper end of the stem 8 being secured to a diaphragm 11 dividing the upper extension of the casing into two compartments or chambers 12, 13.

The compartment 12 is open to the atmosphere through an aperture 14 and the compartment 13 communicates through a non-return valve 15 with the automatic brake pipe at 16, and also through a restricted port 17, with the upper side of the piston 18 of an equalizing discharge valve mechanism of the well known type, the non-return valve 15 permitting rapid recharging of the automatic brake pipe 16, but preventing flow of fluid from the train pipe during an application of the brakes in which case the port 17 controls the application.

The upper part of the vertical stem 8 is of tubular construction, its upper open end forming a valve seat 19, and the hollow interior 20 of the stem 8 communicating through an aperture 21 with the compartment 12. Located in the tubular upper end of the stem is a poppet valve 22 connected by means of a pin connection 23 forming an extension of the wings with an inlet valve 24 provided with a seat 25, this valve controlling communication between a pipe or passage 26 leading to a feed valve not illustrated in the drawing and the compartment 13.

The inlet valve 24 is provided with a controlling spring 27 tending to move the valve to its closed position.

The lower side of the equalizing discharge valve piston 18 is in communication with the automatic brake pipe at 16 through a restricted orifice 28, the upper side of the piston 18 communicating through passage 42, in accordance with the usual practice, with an equalizing reservoir not illustrated in the drawing.

The operation of the control valve device is as follows:

Assuming that the normal degree of vacuum is maintained in the vacuum brake pipe 7, the atmospheric pressure on the under side of the diaphragm 2 assisted by the pressure of the spring 6 tends to move the diaphragm 2 upwards, this upward movement being, however, opposed by the pressure of the fluid supplied from the feed valve through 26 and past the inlet valve 24 to the upper side of the diaphragm 11, so that under these conditions of equilibrium the tubular end of the stem 8 is in engagement with the poppet valve 22, the inlet valve 24 being lifted from its seat 25.

When, however, atmospheric air is admitted to the vacuum brake pipe 7 through the driver's brake valve to effect an application of the locomotive brakes, the diaphragms 2, 11 are moved downwards under the increased pressure in the vacuum brake pipe 7, with the result that the inlet valve 24 is permitted to engage with its seat 25, thereby cutting off communication between the feed valve and the automatic brake pipe 16. As soon as the inlet valve 24 is seated the further downward movement of the diaphragms 2, 11 causes the tubular end of the stem 8 to be withdrawn from engagement with the poppet valve 22 with the result that the compartment 13 is in communication with the atmosphere through the hollow interior 20 of the stem, the aperture 21 in the stem and the aperture 14.

Fluid under pressure is thereupon vented from the upper side of the equalizing discharge valve piston 18 to the atmosphere through the restricted port 17, the compartment 13 and apertures 21, 14 and the piston 18 moves upwards to vent the automatic brake pipe 16 to atmosphere in the usual manner through the valve controlled port 29.

As soon as the automatic train pipe pressure has been reduced to a predetermined extent by the flow of fluid to the atmosphere through the equalizing discharge valve, the pressure acting on the upper side of the diaphragm 11 is reduced to an extent sufficient to compensate for the increased pressure on the upper side of the diaphragm 2, whereupon the diaphragms 2, 11 will move upwards again under the upward pressure exerted by the spring 6 and the poppet valve 22 will close with the result that the release of fluid from the upper side of the equalizing discharge valve piston 18 is interrupted. Owing to the release of fluid from the automatic brake pipe 16 the fluid pressure acting on the lower side of the equalizing discharge valve piston 18 is reduced, with the result that this piston again moves downward to close the equalizing discharge valve exhaust port 29.

It will be understood that by adjusting the action of the spring 6 on the lower side of the diaphragm 2, the reclosure of the equalizing discharge valve can be arranged to be effected when any desired degree of reduction in automatic brake pipe pressure has occurred and in practice, it is preferable to adjust the spring 6 so that when the vacuum in the vacuum brake pipe 7 is completely destroyed the equalizing discharge valve will re-close when the pressure in the automatic brake pipe 16 has been reduced from its normal value of 70 pounds per square inch to 50 pounds per square inch.

During the release of the brakes, the converse action of the parts of the device will occur as will be obvious without further description.

The apparatus may also be provided with an emergency valve such a valve being illustrated in Figure 2. The emergency valve illustrated in Figure 2 comprises a small reservoir 30 closed at its lower end by means of a flexible diaphragm 31 which is provided with a downwardly projecting stem 32 having a small aperture 33 therein, through which the reservoir 30 is maintained at the pressure obtaining in the vacuum brake pipe 7.

The stem 32 extends downwards through a fluid tight packing 34 in the lower part of the valve casing 35 below the diaphragm 31 and the lower end of the stem 32 is pivotally connected to one end 36 of a lever 37, the other end 38 of which is pivotally mounted at a fixed point in the casing 35.

An intermediate point 39 in the lever is adapted to engage with the stem 40 of a poppet valve 41 establishing communication between the automatic brake pipe 16 and the atmosphere, the action of the emergency valve device being as follows:

Assuming that the normal degree of vacuum is maintained in the vacuum brake pipe 7, the pressure conditions on the upper and lower sides of the diaphragm 31 are the same and the diaphragm stem 32 and the lever 37 to which it is connected, are in their lower normal position, the lever 37 being out of engagement with the stem 40 of the poppet valve 41.

In the event of an emergency application of the brakes being effected by establishing free communication between the vacuum brake pipe 7 and the atmosphere, so as completely to destroy the vacuum, the diaphragm 31 and its stem 32 will move upwards under the action of the atmospheric pressure on the lower side of the diaphragm, with the result that the lever will be raised so as to engage with the stem 40 of the poppet valve and lift the latter from its seat so as to vent the automatic brake pipe 16 to the atmosphere and thus effect an emergency application of all the brakes of the train.

The chamber on the lower side of the diaphragm is preferably connected to the vacuum brake pipe 7 adjacent to the driver's brake valve so as to render the action of the emergency valve device very sensitive, this sensitiveness being reduced if necessary to the desired extent by interposing a choke plug in the passage connecting the emergency valve device to the vacuum brake pipe.

The invention is evidently not limited to the particular constructional forms above described which may be varied in many respects without exceeding the scope of the invention.

Having now described my invention, what I claim as new and desire to secure by Letters Patent, is:—

1. Fluid pressure braking apparatus of the combined fluid pressure and vacuum type comprising a valve for automatically controlling the release of fluid under pressure from the automatic brake pipe under the combined influence of the automatic brake pipe pressure, the pressure obtaining within the vacuum brake pipe and a constant pressure, for the purpose specified.

2. Fluid pressure braking apparatus as claimed in claim 1, in which an additional valve mechanism is provided for releasing fluid under pressure from the automatic brake pipe in the case of an emergency application of the brakes, this valve being operated only when the vacuum brake pipe pressure is raised to an extent corresponding to an emergency application of the brakes.

3. Fluid pressure braking apparatus as claimed in claim 1, in which the automatic brake pipe pressure and the vacuum brake pipe pressure are arranged to act upon abutments operatively connected to the valve in such a manner that the vacuum brake pipe pressure normally tends to close the valve and the automatic brake pipe pressure normally tends to open the valve, a spring being arranged in such a manner as to assist the action of the vacuum brake pipe on the valve.

4. Fluid pressure braking apparatus of the combined fluid pressure and vacuum type comprising a valve for automatically controlling the release of fluid under pressure from the automatic brake pipe under the combined influence of the automatic brake pipe pressure, the pressure obtaining within the vacuum brake pipe and a constant pressure, for the purpose specified, and in which an additional valve mechanism is provided for releasing fluid under pressure from the automatic brake pipe in the case of an emergency application of the brakes, this valve being operated only when the vacuum brake pipe pressure is raised to an extent corresponding to an emergency application of the brakes, the additional valve mechanism comprising an abutment subject on one side to the pressure in the vacuum brake pipe and on the other side to the pressure in a vacuum reservoir, the abutment being operatively connected to a valve controlling communication between the vacuum brake pipe and the atmosphere and a valve controlling communication between the automatic brake pipe and the atmosphere.

5. Fluid pressure braking apparatus as claimed in claim 1, in which the valve is operatively connected to another valve controlling communication between a feed valve device and the automatic brake pipe, for the purpose specified.

In testimony whereof I have hereunto set my hand and seal, at London, England, this 5th day of March, 1928.

HARRY J. WINTER. [L. S.]